Patented June 4, 1935

2,003,789

UNITED STATES PATENT OFFICE 2,003,789

COMPOSITION AND METHOD OF PREPARING SAME

Robert L. Falls, Charlotte, N. C., assignor of five per cent to J. F. Kelley, Rock Hill, S. C.

No Drawing. Application August 27, 1932, Serial No. 630,698

3 Claims. (Cl. 106—33)

This invention relates to a composition adapted to be used in the formation and making of any desired type of container and relates more especially to a method and means of hardening paraffin wax and raising its melting point to a point where it can be used in the manufacture of containers and other desired articles.

Heretofore, many attempts have been made toward the development of different processes for the hardening of paraffin wax and raising its melting point so it can be used for containers and other articles of manufacture, but so far as I am aware, none of these have been satisfactory.

It is an object of this invention to provide a composition having as its base a commercial type of paraffin wax which usually has a melting point ranging between 120 and 170 degrees F., and by the use of my method it is possible to take a paraffin wax having a melting point among the lowest brackets and produce, in combination with the method hereinafter explained, a composition which can be molded or otherwise formed into containers or other articles of commerce to produce a suitable and durable container having a relatively great degree of hardness, greater than has heretofore been attained by the use of a paraffin wax as a base and which has a high melting point. By paraffin wax, I mean a by-product of the distillation of petroleum which is usually referred to by the name employed, namely paraffin wax.

The composition produced by the hereinafter disclosed method has been found very suitable for the manufacture of any acid resisting surface, containers and the like in which the acids do not react, or in any case where acids themselves or external influences do not produce a temperature greater than approximately 125 to 150 degrees F.

One method of producing the composition for manufacture of containers and other articles has been found to be very successful which is as follows:

I take approximately ten pounds of paraffin wax and place it in a vat or other suitable container and heat the same to the boiling point of the paraffin wax. I then take approximately one pound of caustic potash sometimes referred to as concentrated lye, and dissolve it in approximately one half gallon of water and stir the mixture continuously until the caustic potash is entirely dissolved in water. I then slowly add the dissolved caustic potash and water to the boiling wax, stirring the wax well as the caustic potash is added, and I continue to stir the mixture of the caustic potash, water and boiling wax for about forty minutes and at all times keeping the mixture in a boiling condition. I then pour the mixture into a cooling vessel and allow it to cool until it reaches room temperature.

During the above described boiling operation the caustic potash attacks the oil in the paraffin wax and removes the oil from the wax. In the cooling operation caustic potash remains in solution with the water and settles to the bottom of the vessel, while the oil removed from the wax rises to the top and forms a layer of scum on top of the cake of wax and is scraped off the wax as it cools or after the wax has fully cooled and becomes hardened. The caustic potash in solution is drained from beneath the wax or if desired the cooled cake of wax is removed from off the solution.

The hardened composition of wax as above formed is then placed in a vessel and heated again to its boiling point. I then add a suitable amount of water and bring the water, along with the wax therein, to the boiling point of the water and wax in combination and hold it in boiling condition for a few minutes, stirring the mixture during such time to wash the alkali from the wax. The temperature of the water and wax is then lowered and the wax, in cooling, forms a cake which floats on the water. I then drain the water from the vessel. The wax remains in the vessel and is again heated to its boiling point, and while boiling, I add thereto any desired quantity from a few ounces up to twelve pounds of English rosin which is a by-product of turpentine distillation. The amount of rosin added is governed by the degree of hardness desired in the finished composition, as it is evident that the greater the quantity of rosin which is added to the mixture, the harder the finished product will be.

I have found by experimentation that approximately twelve pounds of rosin is the maximum which will be effective, but it is possible that a greater amount of rosin may be employed in combination with the above mixture by slight change in the method and I do not wish to be limited to such restrictions as above set forth.

While the mixture with the rosin therein is boiling, I also add thereto approximately one half pint of grain alcohol and stir the mixture thoroughly, still maintaining it at a boiling point and this stirring operation is carried on for a few minutes until the ingredients are thoroughly mixed. Although it is evident that some of the alcohol will escape by evaporation, it performs its purpose which I believe to be that of dissolving the rosin thoroughly and causing it to thoroughly mix with the remainder of the composition.

I believe that another function of the alcohol is to convert any portion of the rosin which will not thoroughly mix with the composition, into a carbonaceous product, such as cinder, which will float on top of the composition and can be removed therefrom before the composition is used for the formation of articles of manufacture.

While the composition is boiling or just below the boiling point, I pour it into suitable molds or otherwise form it into various articles of manufacture it being evident that either by molding or other processes, suitable containers or other articles of manufacture of any desired shape or for any desired purpose may be manufactured by this composition which are much harder than ordinary paraffin wax.

Heretofore, it has been considered impossible to apply a finishing surface to a paraffin object on account of the fact that the oily nature thereof prevents adherence thereto of paints, varnishes, or any covering which is adapted to be applied to the outer surface and to adhere thereto.

By employing the above outlined process, I not only produce a substance which is hard enough for normal wear and for normal uses as a container or other article of manufacture and has a high melting point, but I produce a composition which has a texture which is of such a nature as to cause paint, varnish, or any other suitable liquid covering to be applied thereto and to dry thereon and to adhere thereto much in the same manner as it would adhere to steel, woodwork, and the like. I do not know why this is so, but I believe that it is caused by the removal of surplus oil from the paraffin and the mixture therewith of the rosin which has a roughening effect on the texture of the composition. The addition of the rosin to the composition is what I believe causes it to have a texture of surface which causes paint to easily adhere thereto.

The mixture when thoroughly prepared and finished, instead of being poured into molds, as above described, can be poured into suitable blocks or forms, if desired, for later use, as all that is necessary is to again melt the composition and to mold or otherwise form it into suitable containers or other articles.

It is, of course, evident that an article or container made according to the above described process should it become broken, at any time during its life, can be melted and repoured, thus providing a container which is the same as a new container or other article as the case may be.

Also it is desired to be pointed out that due to oxidization or other chemical reactions which occur in the composition, the older the composition becomes, or the articles made therefrom, the harder they become on account of oxidization and ageing.

I have found also that instead of using caustic potash that equally good results can be obtained by the use of a composition comprising approximately 76 per cent sodium hydroxide, 10 per cent sodium carbonate, and 14 per cent inert ingredients, sometimes referred to as caustic soda. These percentages may, of course, be varied within certain limits.

In the specification, I have set forth a preferred embodiment of the invention, and although specific terms are employed, they are used in a generic and descriptive sense only and not for purposes of limitation, the scope of the invention being set forth in the appended claims.

I claim:

1. That method of preparing a composition for use in the manufacture of containers and other articles which comprises taking a quantity of paraffin wax, heating the paraffin wax to its boiling point, adding caustic potash in solution to the boiling paraffin wax, allowing the mixture to cool and separating the wax from the dissolved caustic potash and heating the treated paraffin wax and bringing it to its boiling point again, adding thereto a quantity of pine rosin, then adding to the mixture a small quantity of grain alcohol.

2. That method of preparing a composition for use in the manufacture of articles which comprises boiling paraffin wax and adding thereto caustic potash in solution then removing the wax from the solution of caustic potash and again boiling the wax and while boiling, adding thereto hardened rosin, then adding thereto a small quantity of alcohol.

3. That method of preparing a composition which comprises boiling paraffin wax in a solution of caustic potash and water, then removing the wax, then melting the wax and adding water thereto while continuing to boil the water and wax, then allowing the water and wax to cool, then removing the water, then heating the wax to its boiling point, and while boiling, adding a small quantity of pine rosin and also adding a small quantity of alcohol.

ROBERT L. FALLS.